Patented Oct. 12, 1948

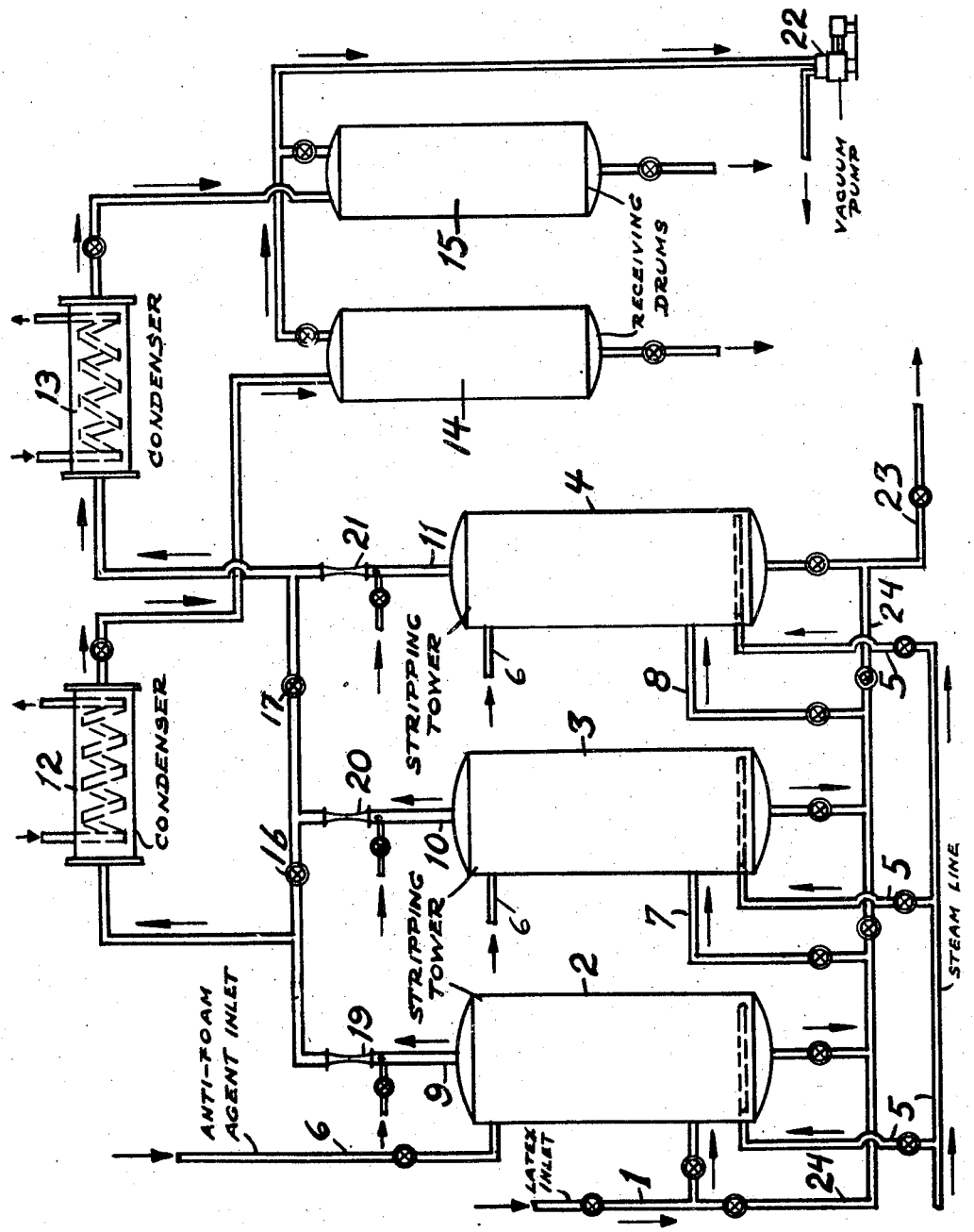

2,451,332

UNITED STATES PATENT OFFICE 2,451,332

STRIPPING OF POLYMER LATICES

Arthur Donald Green, Cranford, N. J., assignor to Standard Oil Development Company, a corporation of Delaware Application December 5, 1942, Serial No. 467,931

4 Claims. (Cl. 202—46)

The present invention pertains to the production of emulsion polymerizates.

It is the object of the present invention to provide the art with a novel process and apparatus for the treatment of emulsion polymerizates.

It is a further object of this invention to provide the art with a novel method and apparatus for continuously stripping latices of synthetic rubber-like materials of unreacted, polymerizable materials.

These and other objects will appear more clearly from the detailed description and claims which follow.

The continuous preparation and processing of synthetic rubber-like emulsion polymerizates is a problem of extremely great importance at the present time. In order to produce synthetic rubber-like materials in the quantities that are now needed, it is desirable that the latices obtained upon emulsion polymerization be treated in a continuous rather than a batch operation. The continuous operation which constitutes the essence of my invention possesses the advantage of requiring smaller equipment and substantially less supervision than a batch operation of equal volume. Furthermore, the product obtained in accordance with the present invention is less degraded, has more uniform properties and gives better results in the subsequent coagulation, filtering, washing, drying, sheeting, and packaging operations.

An apparatus suitable for the continuous stripping of latices of synthetic rubber-like materials in accordance with the present invention is shown diagrammatically in the accompanying drawing.

In the drawing 1 is a line for supplying latex to the stripping apparatus. 2, 3, and 4 are stripping vessels or drums through which the latex is passed successively. It is to be understood that the number of drums or stages in which stripping is effected is not necessarily three and that a greater or lesser number may be used as desired. A single drum or as many as ten or more drums may be used.

While a single stage with a very long holdup would allow fairly good stripping, it would also impair the quality of the product by exposure to high temperatures for a long time. The optimum number of stages will be determined by the degree of stripping it is desirable to achieve and the rate at which product quality diminishes at a given stripping temperature. In general, the greater the number of stages, the more complete the stripping of unreacted material, the total holdup of the system being constant. Also, in a system having a constant total holdup time, the percentage of material passing through the system held therein for times appreciably exceeding the nominal holdup time diminishes with increasing number of stages. The nominal holdup time=

$$\frac{\text{Total liquid capacity of system}}{\text{Rate of liquid throughput}}$$

Assuming perfect mixing in a continuous flow system, as in the present process, with liquid entering a given stage as fast as it leaves it, the effluent from the system will consist of a composite of material which has resided in the system varying lengths of time from essentially zero to infinity, the distribution being given by a probability curve. (See "The Theory of Short Circuiting and Continuous Flow Mixing Vessels in Series" by MacMullin and Weber, Transactions of Am. Inst. Chem. Eng. 31, 409 (1935).) It is evident, therefore, that if the stripping operation requires a finite time, the material cannot be 100% stripped no matter how great the holdup time of the one stage is made. It is possible, however, to get as close to 100% as is desired by using nominal holdup times much greater than the finite stripping time shown to be necessary by batch experimental tests. However, while part of the material will have remained in the system just long enough to be completely stripped, some other fractions will have remained in the system much longer and perhaps so long as to injure their properties.

When more than one stage is used, the chances of short circuiting or of portions of the material under treatment remaining in the system for times appreciably exceeding the total nominal holdup time of the system diminishes as the number of stages is increased until with an infinite number of stages (as in a pipe), the actual residence time of every bit of effluent leaving the system equals the nominal holdup time. With a plurality of stages, shorter nominal holdup time, and consequently smaller equipment can be used to get both better stripping and less product degradation.

Accordingly, while it is true that a single stage continuous process with very long holdup time would allow fairly good stripping, it would also tend to impair the quality of the product by excessively long exposure to high temperatures. The optimum number of stages will be readily determined by the degree of stripping it is desirable to achieve and the rate at which product quality diminishes at a given stripping temperature. Especially in the case of acrylonitrile stripping it is not economical to use a vacuum much below 100 mm. mercury absolute, and even at a temperature (about 125° F.) corresponding to this pressure, product quality decreases after about 5 hours' exposure.

Lines 5 are provided at the bottom of each vessel for the supply of an agent to facilitate the stripping of the latex of unreacted polymerizable materials. Instead of directly injecting a stripping agent into the latex, the latex may be indirectly heated in order to vaporize the unpolymerized olefinic material. Means may also be provided as shown at 6 in the drawing for supplying an anti-foam agent such as lanolin to one or more of the stripping vessels. The stripping agent may be steam or other vapors or gases, such as methane, ethylene, benzene, butadiene, etc.

Connections 7 and 8 are provided between drums 2 and 3 and drums 3 and 4 respectively, with suitable means for effecting the desired transfer of latex from one vessel to another. For example, a pump may be provided in each connection for transferring the latex to successive stages. Alternatively the pressure in each stage may be maintained at successively lower values in each stage, in which event a suitable flow controlling device or valve is provided in each of the connections for regulating the flow of latex through the system, or the latex may be allowed to overflow from each stage to the next by suitable arrangement of draw-off piping.

Provision may also be made in the piping, as shown in the drawing, for by-passing one or more of the stages in order to permit cleaning of the stripper tower. The steam or other stripping agent and vaporized olefinic material are discharged from the stripping drums through lines 9, 10, and 11, which are connected to condensers 12 and 13 and receivers 14 and 15 wherein the steam and monoolefinic material are condensed. The number of condensers provided is also variable, depending upon the number of stripping drums provided and the amount of monomeric material stripped in each. A convenient arrangement is shown in the drawing wherein two condensers are provided to handle the vapors from three stripping vessels. Valves 16 and 17 are provided in the vapor discharge lines from the stripping vessels so that the vapor from stripper 3 may be transferred either to condenser 12 or to condenser 13. In this arrangement, when stripper 3 is connected to condenser 12, valve 17 is closed and valve 16 is opened, thereby placing vessels 2 and 3 in communication with condenser 12. When strippers 3 and 4 are connected to condenser 13, valve 17 is open and valve 16 is closed, thereby placing vessels 3 and 4 in communication with condenser 13.

The number and method of operating the condensers is dependent principally upon the amount of monomeric materials stripped in the respective stripping towers. If the bulk of the unpolymerized olefinic material is separated in the first tower, it is desirable to condense such vapors separately in order to obtain a fairly concentrated condensate which is suitable for recycling to the polymerization process, while the vapors from the other strippers are combined and the condensate run to sewer since it is ordinarily too dilute to warrant any further effort to recover monomeric materials. On the other hand, if a substantial amount of monomeric material is also stripped in the second tower, it is desirable to combine the vapors from the first and second towers and recycle the resultant condensate while discharging the condensate of the vapors from the third stripper to sewer. It is to be understood, of course, that all the condensate from the several strippers may be recycled to the polymerization process if desired.

The stripping towers are preferably operated at a relatively low pressure, in the neighborhood of 75–200 mm. of mercury absolute. In order to aid in the condensation of the vapors evolved in the strippers it may be advisable to use steam boosters 19, 20 and 21 or other vapor compression equipment in the lines between the stripping towers and the condensers. The use of these boosters is particularly applicable for nitrile stripping and their function is to maintain a low stripper pressure and hence temperature (thus avoiding injury to the polymer) but a higher condenser pressure so that low boiling substances such as the acrylonitrile azeotrope may be condensed without refrigeration. The boosters are not essential and may be omitted if desired in styrene stripping. If desired, refrigeration may be used to aid condensation, instead of vapor compression or the vapors may be scrubbed with a solvent such as water. The pressure on the stripping system is maintained below atmospheric pressure by connecting the receivers 14 and 15 to a suitable source of vacuum such as a vacuum pump 22 or a steam jet.

The latex stripped of unpolymerized olefinic material is discharged from the last stripping vessel through line 23 and is then passed to suitable coagulating, filtering, washing and drying equipment.

The process and the apparatus of the present invention can be used to strip various polymer emulsions of unpolymerized olefinic material. For example, it may be used to strip nitriles from emulsions obtained in the production of diolefin-nitrile copolymerizates such as butadiene-acrylonitrile copolymers or styrene from diolefin-styrene copolymerizates such as synthetic rubber-like butadiene-styrene copolymers or isoprene and styrene from the resinous, modified styrene copolymers prepared in accordance with the teachings of application Serial No. 408,814, filed August 29, 1941 by Gleason et al. now abandoned. It may also be used to strip unpolymerized styrene or acrylonitrile or homologues thereof from the emulsions obtained in polymerizing said polymerizable olefinic materials in aqueous emulsion. The particular method of preparing the emulsion polymerizate is not a part of my invention and numerous well-known methods of making such emulsion polymerizate may be used. For example, a diolefin such as butadiene or its homologues and a substance capable of copolymerizing therewith such as acrylic acid nitrile, methacrylic acid nitrile, styrene and its homologues, acrylic and methacrylic acid esters, methyl vinyl ketone and the like are emulsified in about double the quantity of water using a suitable emulsifier such as a soap or other surface active material. Polymerization of the resultant emulsion is effected at about room temperature or slightly higher and in the presence of a suitable oxygen liberating catalyst such as hydrogen peroxide or an alkali metal or ammonium perborate or persulfate.

The polymerization is continued until approximately 70–75% of the monomeric compounds are polymerized. The particular percentage conversion is a variable depending upon the nature of the initial materials used and the physical properties desired in the final polymer. In the case of butadiene copolymers, nearly all the unreacted butadiene may be removed simply by flashing the latex to atmospheric or subatmospheric pressure at substantially the polymerization temperature. The latex is then ready for the stripping of unpolymerized mono-olefinic material in accordance with the present invention. In the case of copolymers of higher homologues of butadiene, a smaller portion of the unreacted diolefin will be removed in the flashing operation, and a mixture of diolefin and mono-olefin will be recovered on stripping.

The following example applies to the stripping of a Perbunan latex, containing unreacted acrylonitrile but little or no unreacted butadiene.

Example 1

A latex containing acrylonitrile is supplied to the first of the stripping towers or drums and, if desired, a stabilizing agent such as phenyl-B-naphthylamine or the like may be added. The latex is subjected to steam distillation and if foaming occurs an anti-foaming agent such as lanolin may be added. The pressure in the first stage by suitable regulation of steam admission is maintained at about 110 mm. and by adjusting the pressure in the second and third vessels to about 105 mm. and 100 mm. respectively, a uniform flow of latex through the apparatus is maintained. Also, the same pressure could be maintained in each, and gravity flow used. The pressure level in each stage is so chosen that the maximum temperature to which the latex is raised in the apparatus is preferably not over 150° F. (Alternatively, the rate of steam admission could be controlled to hold a temperature of say 130° F. in each stage.) It is also advisable to proportion the number of stripping vessels and the rate of feed so that no great fraction of the latex is held in the system for a time sufficient to injure its properties.

The vapors leaving the strippers are compressed by steam boosters, one for each stage, to a pressure of 350 mm. Hg absolute. By segregating the vapors from the first and second strippers and condensing the same, a condensate is obtained which is suitable for recirculation to the polymerization step. The condensate from the third tower may be discarded entirely or a portion may be fed to the polymerization system to supply the necessary water. The latex stripped of monomeric polymerizable materials discharged from the last stripping tower may be cooled, if desired, before coagulation, which may be effected in any desired manner, whereupon the coagulate may be filtered, washed and dried.

Example 2

A copolymer was prepared by polymerizing a mixture of butadiene and styrene in the ratio of 3 to 1 in aqueous emulsion utilizing the conventional procedure (i. e. 2 to 1 ratio of water to reactants with about 2½% of emulsifier, 0.5% of polymerization modifier (dodecyl or lorol mercaptan) and about 0.2% of catalyst (potassium persulfate). The foregoing percentages are based upon the water present. The mixture was polymerized to 66% styrene conversion whereupon the butadiene was flashed off, a stabilizer was added and the latex was then stripped of styrene under batch conditions as well as continuously using one, two, three and four stage systems. Batch stripping of the latex gave essentially 100% styrene removal in five hours. In the continuous stripping operations, the nominal holdup time for each system was five hours. The following table summarizes the results obtained:

| No. of Stages | Percent Styrene Removal | Percent Held over 10 Hrs. |
|---|---|---|
| 1 | 63.3 | 13 |
| 2 | 87.1 | 10 |
| 3 | 95.7 | 7 |
| 4 | 98.6 | 5 |

The table also brings out the fact that with increase in number of stages the completeness of stripping is increased (as well as the fact that the fraction of material exposed to stripping temperatures for very long times decreases). This is believed to be due to the fact that stripping of Buna S latex is a time reaction, probably controlled by the rate of diffusion of stryene from the rubber into the aqueous or into the gaseous phase. Therefore, the degree of completion of stripping will increase in the same measure as short circuiting is diminished with increasing number of stages. The advantage of using vessels having an appreciable holdup time instead of say a packed column is herewith also apparent.

The foregoing description is intended to be illustrative but my invention is not to be considered as limited thereto since numerous variations are possible within the scope of the following claims.

I claim:

1. The process of continuously stripping latices of emulsion polymerizates comprising a nitrile corresponding to the formula

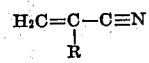

wherein R stands for a member of the group consisting of hydrogen and alkyl radicals of unpolymerized nitrile which comprises continuously passing a stream of said latex through several stripping zones in series, vaporizing the unpolymerized nitrile from the latex by applying vacuum to and passing a stripping gas through the latex, continuously removing stripped latex from the last stripping zone, continuously removing the vaporized nitrile from each zone, passing the vaporized nitrile through a vapor compressor in order to increase the pressure and the condensing temperature thereof, condensing and recovering the nitrile and maintaining the total nominal hold-up time and temperature of the several stripping zones sufficiently low that the properties of the polymer product are not appreciably degraded.

2. The process of continuously stripping latices of emulsion polymerizates comprising a nitrile corresponding to the formula

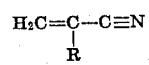

wherein R stands for a member of the group consisting of hydrogen and alkyl radicals of unpolymerized nitrile which comprises continuously passing a stream of said latex through several stripping zones in series, vaporizing the unpolymerized nitrile from the latex by applying vacuum to and passing a stripping gas through the latex, continuously removing the stripped latex from the last stripping zone, continuously removing the vaporized nitrile from each zone, passing the vaporized nitrile through a steam booster in order to increase the pressure and the condensing temperature thereof, condensing and recovering the nitrile from the first stripping zone and discarding the recovered nitrile from the last stripping zone and maintaining the total nominal hold-up time and temperature of the several stripping zones sufficiently low that the properties of the polymer product are not appreciably degraded.

3. In the process of continuously stripping latices of emulsion polymerizates comprising an unpolymerized, normally liquid, unsaturated compound, the improvement comprising continuously passing a stream of said latex through several stripping zones in series, vaporizing the said unpolymerized unsaturated compound from the latex by applying vacuum to and passing a stripping gas through the latex, continuously removing the stripped latex from the last stripping zone, continuously removing the said vaporized unsaturated compound from each zone, passing the vaporized unsaturated compound through a vapor compressor in order to increase the pressure and the condensing temperature thereof, condensing and recovering the unsaturated compound and maintaining the total nominal hold-up time and temperature of the several stripping zones sufficiently low that the properties of the polymer product are not appreciably degraded.

4. In the process of continuously stripping latices of emulsion polymerizates comprising unpolymerized styrene, the improvement comprising continuously passing a stream of said latex through several stripping zones in series, vaporizing the said unpolymerized styrene from the latex by applying vacuum to and passing a stripping gas through the latex, continuously removing the stripped latex from the last stripping zone, continuously removing the said vaporized styrene from each zone, passing the vaporized styrene through a vapor compressor in order to increase the pressure and the condensing temperature thereof, condensing and recovering the styrene and maintaining the total nominal hold-up time and temperature of the several stripping zones sufficiently low that the properties of the polymer product are not appreciably degraded.

ARTHUR DONALD GREEN.

REFERENCES CITED

The following references are of record in the file of this patent:

UNITED STATES PATENTS

| Number | Name | Date |
|---|---|---|
| 1,356,878 | Newton | Oct. 26, 1920 |
| 1,874,546 | Konrad | Aug. 30, 1932 |
| 1,991,791 | Conbrough | Feb. 19, 1935 |
| 2,147,306 | McCulloch | Feb. 14, 1939 |
| 2,161,798 | Carter | June 13, 1939 |
| 2,184,579 | Brucke | Dec. 26, 1939 |
| 2,224,925 | Potts et al. | Dec. 17, 1940 |
| 2,350,609 | Hachmuth | June 6, 1944 |
| 2,350,584 | Buell et al. | June 6, 1944 |
| 2,379,268 | Zimmer | June 26, 1945 |
| 2,383,176 | Willkie | Aug. 21, 1945 |

FOREIGN PATENTS

| Number | Country | Date |
|---|---|---|
| 364,089 | Great Britain | 1931 |